Nov. 24, 1942.  J. B. DYER  2,302,681
ENGINE CONTROL APPARATUS
Filed Feb. 23, 1932  3 Sheets-Sheet 1

Inventor
John B. Dyer

Nov. 24, 1942.   J. B. DYER   2,302,681
ENGINE CONTROL APPARATUS
Filed Feb. 23, 1932   3 Sheets-Sheet 3

Patented Nov. 24, 1942

2,302,681

UNITED STATES PATENT OFFICE 2,302,681

ENGINE CONTROL APPARATUS

John B. Dyer, Pendleton, Ind., assignor, by mesne assignments, to General Motors Corporation, Detroit, Mich., a corporation of Delaware Application February 23, 1932, Serial No. 594,553

24 Claims. (Cl. 290—37)

This invention relates to apparatus for controlling the operation of internal combustion engines, more particularly those of automotive vehicles and specifically to apparatus for controlling the starting devices for such engines.

It is an object of the present invention to provide means for controlling the operation of the engine starting apparatus in response to the operation of certain control devices which must be operated by the operator of the vehicle to control its operation under ordinary driving conditions. In other words it is an object of the invention to provide a control device for the starting apparatus so constructed that operation of a special control member for the starting apparatus is eliminated, when it is desired to start the engine initially or when said engine is to be restarted in the event of accidental stalling of said engine.

More specifically it is an object of this invention to control the engine starting apparatus in response to the control of other electrical apparatus associated with the engine and also in response to the operation of some mechanical device associated with the engine or vehicle, such for instance as the accelerator pedal.

In conjunction with these controls it is a further object of the present invention to provide means for preventing the use of the engine starter while the engine is running under its own power.

According to the present invention these objects are attained by the provision of a starting motor controlled by the ignition switch and the accelerator pedal, so that such motor is rendered effective on operation of the ignition switch and accelerator pedal when the engine is not running, in conjunction with means operable by engine suction, the generator, or both together to prevent the actuation of the starting motor while the engine is running under its own power.

Further objects and advantages of the present invention will be apparent from the following description, reference being had to the accompanying drawings, wherein a preferred embodiment of one form of the invention is clearly shown.

Figure 1:
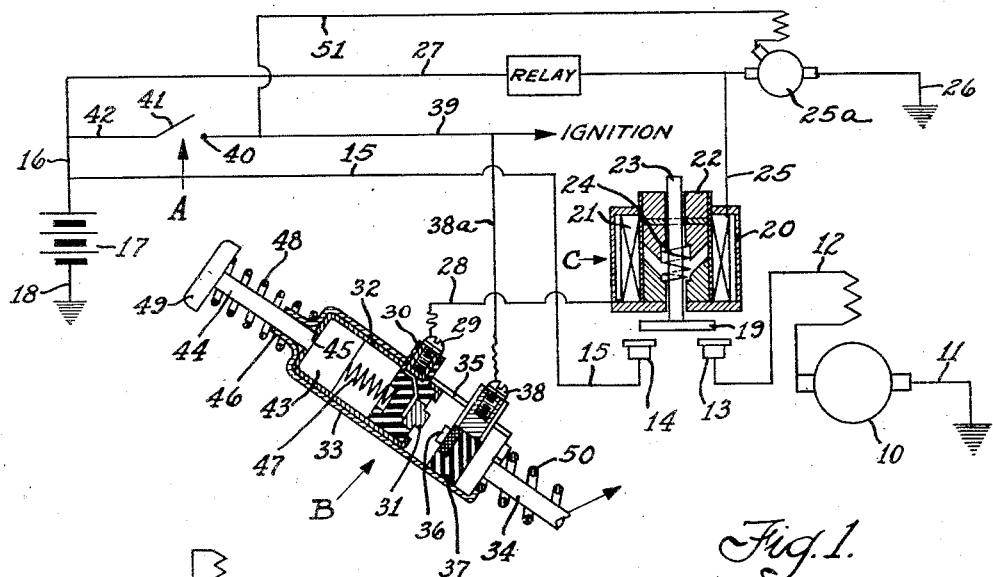
Fig. 1 is a wiring diagram of one form of the present invention in which the means for rendering the starting motor ineffective is controlled by the generator.

Referring to Fig. 1, the starting motor 10 is grounded at 11. This starting motor is adapted to turn the engine to start it through the medium of the well known Bendix drive in which a driving pinion driven by the motor shaft is automatically moved into mesh with a suitable gear on some part of the engine to be driven, such as the flywheel, when the motor circuit is closed, and is automatically disengaged from the flywheel when the engine starts to run under its own power. The construction and operation of the Bendix drive is so well known that further showing or description is believed unnecessary.

It should be particularly understood that in all the modifications of the invention disclosed herein the starting motor is equipped with the Bendix drive, the various control systems embodied in these modifications being particularly well adapted for this form of starting device.

The starting motor 10 is connected by the wire 12 with one fixed contact 13 of an automatically controlled switch, the other fixed contact 14 of which is connected by a wire 15 with a wire 16 leading from a storage battery 17 which is grounded at 18. Cooperating with the fixed contacts 13 and 14 is a movable contact 19 of an automatic switch which will be hereinafter more fully described. Obviously when the contact 19 engages the contacts 13 and 14, the circuit of the motor 10 is closed and the motor will be rendered effective to start the engine. Current will flow from the battery to ground through connection 18, and through wires 15 and 16; switch contacts 13, 14 and 19; wire 12 to the motor and through wire 11 to ground again.

The automatic switch is adapted to be closed by action of the ignition switch and a switch operated from the accelerator pedal which controls the quantity of mixture supplied from the carburetor to the engine, while the automatic switch is rendered ineffective by the generator when the engine is operating at a predetermined speed. The automatic switch is a magnetic device comprising a housing 20 in which is received the winding 21 of an electromagnet which is electrically connected as later described. The magnet is provided with a core 22 and an armature 23 in the form of a rod carrying the contact 19. A spring 24 normally holds the armature in such position that the magnetic switch is open when the magnet is not energized. One end of the winding 21 is connected by a wire 25 with a generator 25a grounded at 26, and connected by a wire 27 with the wire 16, the usual cut-out relay being provided as indicated in the drawings. The other end of the winding 21 is connected by a wire 28 with a binding post 29 supported in a block of insulating material 30 and electrically connected to a contact 31, also supported in the block 30, the latter being mounted in a sleeve 32, slidable in another sleeve 33, supported suitably in fixed position on the end of the rod 34 which extends to the carburetor throttle. A portion of the block 30 carrying the binding post 29 extends through a slot 35 formed in the outer sleeve 33 so as to permit movement of the block relative to said sleeve for the purpose of moving the contact 31 into engagement with another contact 36 carried by an insulating block 37 mounted in the outer sleeve 33 in any desirable way so as to be fixed relative thereto. This block carries a binding post 38 to which is connected a wire 38a leading to a wire 39 connected to the fixed contact 40 of the ignition switch which has a movable contact member 41 connected to the wire 16 by wire 42. In order to move the block 30 so as to engage the contacts 31 and 36, there is received within the inner sleeve 32 a piston 43 secured to a rod 44 extending through a hole in the closed end 45 of the inner sleeve 32 and through a reduced neck 46 formed on the outer sleeve. Springs 47 and 48 hold the piston in the position shown adjacent the end 45 and separated from the block 30, while a head 49 is provided on the end of said rod to facilitate operation thereof by the operator's foot. A spring 50 holds the whole accelerator rod assembly in a position when the carburetor throttle is substantially closed.

For convenience in describing the operation, the ignition switch, the accelerator controlled switch and the magnetic switch are indicated in their entirety as A, B and C.

The operation of the above described devices is as follows: If it be assumed that the engine is not running and the operator desires to start it he first turns on the ignition switch. This renders the ignition system effective, an additional manual operation is necessary, namely, the operation of the accelerator pedal, which also properly positions the carburetor throttle to supply the desired amount of mixture to the engine cylinders. When the switch A and the switch B are both closed the magnetic switch is energized to complete the starting motor circuit, but on operation of either the switch A or switch B alone, energization of the switch C is not effected and the starting motor remains inoperative. When switches A and B are closed current flows from the battery to ground and through the wires 16 and 42, switch A, wires 39 and 38a, switch B, wire 28, winding 21, wire 25, the generator 25A and wire 26 to the ground completing the circuit through the magnet rendering the starting motor effective. When the engine is running under its own power and the generator is operating at a predetermined speed the counter voltage set up by the generator effects deenergization of the magnet and opening of the switch C, which remains open as long as the engine is running under its own power, and prevents the starting motor becoming operative while the engine continues to run, notwithstanding the fact that the switches A and B remain closed during normal engine operation unless the operator releases the button 49.

If the switch B be considered in detail it will be obvious that the first movement of the rod 44 will compress the springs 48 and 47 until the piston 43 engages the block 30, then the block 30 will be moved to engage the switch contacts 31 and 36, before any movement of rod 34 to move the carburetor throttle takes place, the spring 50 being of greater strength than the combined strength of springs 47 and 48. Further movement of the button 49 after the contacts 31 and 36 are in engagement effects movement of the carburetor throttle, so as to position the latter whenever desired. Since the switch B is closed before the throttle is opened at all it will be obvious that said switch will remain closed during all normal driving unless the operator's foot is removed from the button 49, for applying the brakes or for some other purpose.

As shown in Fig. 1, the generator is of the separately excited type, a third brush of the generator being connected by the wire 51 with the fixed contact 40 of the ignition switch. While it is not necessary that this form of generator be employed, and a generator of ordinary type could be used the counter voltage set up in the magnetic switch is so much higher during very low speed operation of the generator, that this type of generator is considerably more efficient in preventing closing of the magnetic switch C during engine operation than a generator of ordinary type. With this type of generator the counter voltage is sufficient at any speed, the engine can operate under its own power to prevent closing of switch C.

Figure 2:
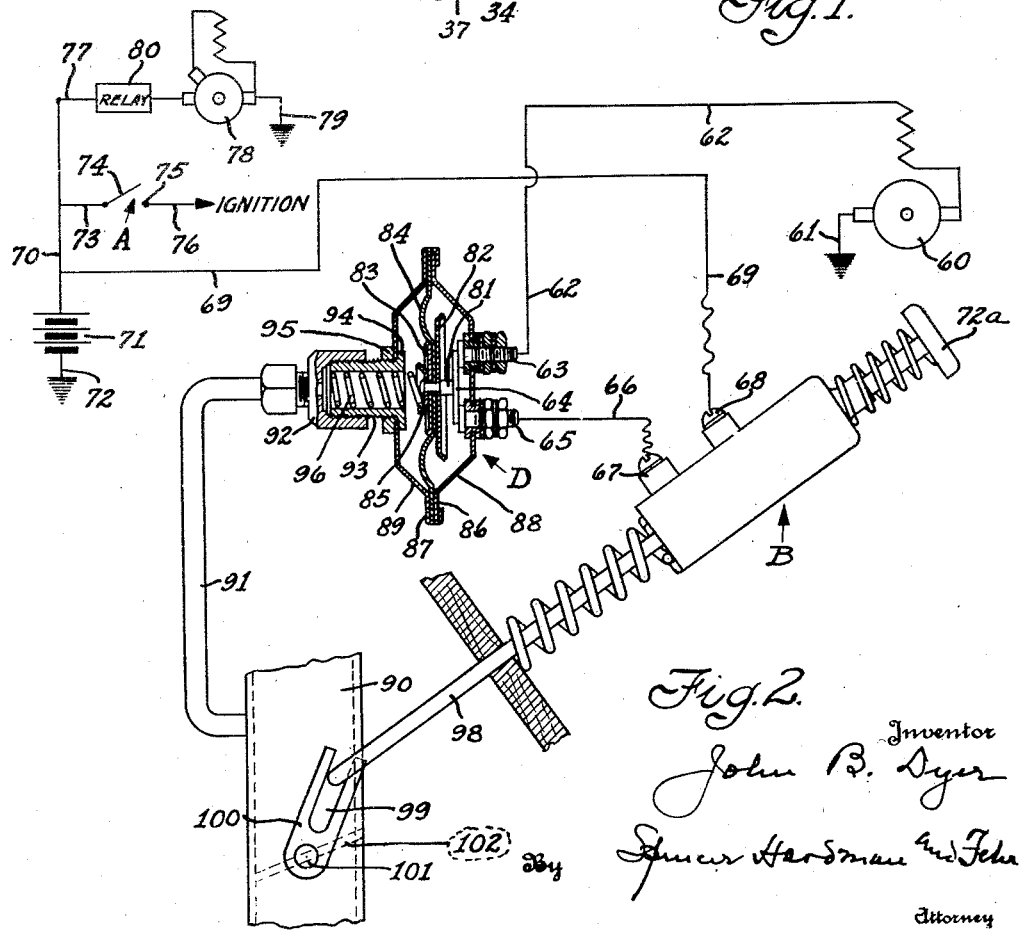
Fig. 2 is a wiring diagram of a modified form of the invention in which the effective use of the starting motor during engine operation is controlled by engine suction.

In the form of the invention shown in Fig. 2, the magnetic switch is omitted and there is substituted therefor in the starting motor circuit a switch indicated in its entirety by the reference character D, which is operated directly by engine suction and is normally closed so that when the ignition switch A and the accelerator controlled switch B are both closed the circuit of the starting motor is completed, such circuit being broken by the suction of the engine when the latter is operating under its own power. The starting motor which is indicated at 60 is grounded at 61 and connected by the wire 62 with one fixed contact 63 of the suction operated switch which comprises a movable contact 64 adapted to engage the contact 63 and another fixed contact 65 connected by a wire 66 with a binding post 67 which is electrically connected with the movable contact of switch B, which is of exactly the same construction as shown in Fig. 1, and the movable contact of which is connected to a binding post 68 which is connected by a wire 69 with the wire 70 leading to a storage battery 71 grounded at 72. The switch B is operated by the foot operating button 72a, similar to the button 49 of Fig. 1.

The wire 70 is also connected by wire 73 with the movable contact 74 of the ignition switch which is adapted to engage a fixed contact 75 connected by wire 76 with the ignition system. The wire 70, is, in addition connected by wire 77 with the generator 78, grounded at 79 and provided with the usual cutout relay 80.

As stated above the switch D is normally closed and when the switch B is closed current flows from the battery to ground through connection 72, and from the battery through wires 70 and 69, switch B, wire 66, switch D and wire 62 to the starting motor 60 and through wire 61 to ground. The engine is thus started, if switch A has been closed to render the ignition system effective and continues to operate until the switch D is opened by engine suction when the engine begins to operate under its own power. To this end the switch contact 64 is integral with or secured to a pin 81 having a reduced portion which extends through two metal disks 82 and 83 and a flexible diaphragm 84 which lies between the discs. A third cup shaped disc 85 is provided adjacent the disc 83 and the whole assembly secured together by riveting the end of the pin or otherwise. The periphery of the diaphragm is secured between peripheral flanges 86 and 87 formed on two sheet metal shells 88 and 89 respectively, the flanges being held together by bolts or in any other suitable way to form an air-tight joint. The contacts 63 and 65 are supported by the shell 88, being suitably insulated therefrom, and the shells 88 and 89 form a suction chamber to which the suction of the engine intake pipe 90 is communicated through a conduit 91 connected by a coupling 92 to a suitable nipple 93 extending through a hole in the shell 89 and provided with a flange 94 between which and a washer 95 screwed on the nipple, said shell 89 is clamped. A spring 96 received within the nipple and extending in the cup shaped disc 85 holds the diaphragm in the position shown in Fig. 2 with the switch closed when the engine is not running. The strength of this spring is great enough to prevent the opening of the switch when the engine is being operated by the starting motor, but the suction communicated to the diaphragm through conduit 91 is sufficient at all speeds when the engine is operating under its own power to open the switch and render the starting motor ineffective.

It will be noted that in this modification of the invention the control of the starting motor circuit is effected entirely through switches B and D, the ignition switch A being effective only, to control the ignition system.

The connection of the accelerator rod with the carburetor throttle is disclosed, the rod 98 engaging a slot 99 in an arm 100 secured to the spindle 101 on which the throttle 102 is mounted and which is journalled in the intake pipe 90.

Figure 3:
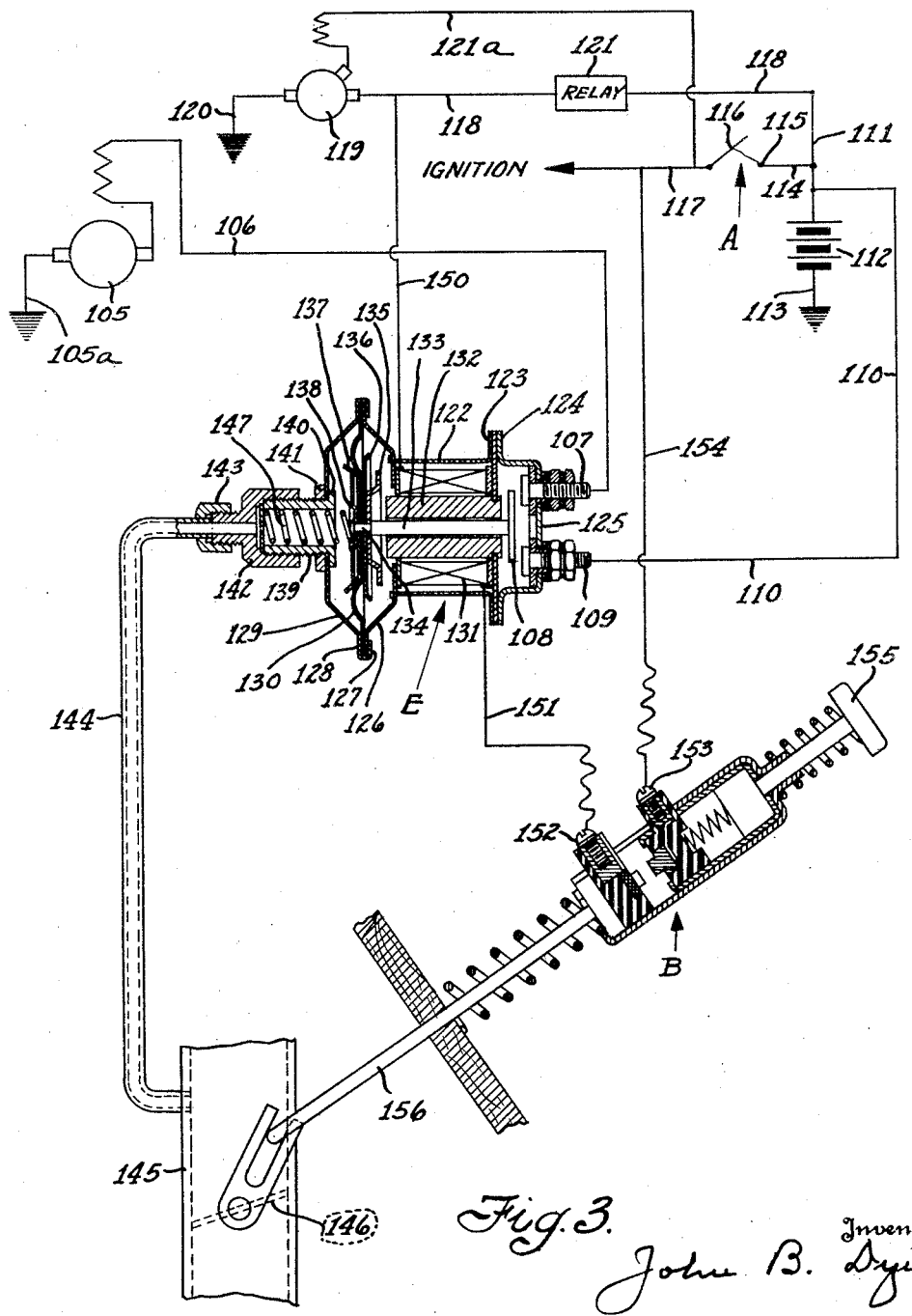
Fig. 3 is a wiring diagram of modified forms of the invention showing means for controlling the effectiveness of the starting motor during engine operation by the joint action of engine suction and the generator.

In the form disclosed in Fig. 3, the circuit of the starting motor is completed upon actuation of switches A and B, and the motor is rendered ineffective by the opening of a secondary or relay switch, indicated in its entirety by the reference letter E and controlled jointly by the action of engine suction and the generator.

In this form of the invention the starting motor 105, is grounded at 105a and connected by a wire 106 to one of the fixed contacts 107 of the relay switch, which comprises a movable contact 108 adapted to engage the contact 107 and another fixed contact 109 connected by a wire 110 with a wire 111 leading to a storage battery 112 grounded at 113. The wire 111 is also connected with a wire 114 leading to the fixed contact 115 of the ignition switch which comprises also a movable contact 116 connected by a wire 117 with the ignition system. The wire 111 is also connected by a wire 118 with the generator 119 grounded at 120 and provided with the usual cutout relay 121. The generator is preferably of the separately excited type, a third brush being connected by the wire 121a with the fixed contact of the ignition switch.

When the switch E is closed the starting motor 105 is rendered effective to start the engine, current flowing, under these conditions from the battery to the ground through the connection 113 and from the battery through wires 111 and 110, the switch E, the wire 106 to the starting motor 105, and through connection 105a to ground again, thus completing the starting motor circuit. The switch E is normally open but is adapted to be closed by the closing of the ignition switch A and switch B in the manner later described, and remains closed until it is opened when the engine begins to run under its own power, by action of the generator and engine suction, whereupon the starting motor becomes ineffective and remains ineffective as long as the engine continues to run.

The switch E comprises a sheet cylindrical housing 122, in which is contained the winding of an electromagnet hereinafter described which operates the switch contact 108. This housing has a flange 123 to which is suitably secured a similar flange 124 on a sheet metal shell 125 which supports the fixed contacts 107 and 109 suitably insulated therefrom. At the opposite end the housing 122 supports a sheet metal shell 126 having a flange 127 which cooperates with a flange 128 on another shell 129. Received between the flanges is a flexible diaphragm 130, and the flanges are pinned in any suitable way to form an air tight joint, as by bolts or by spinning the edge of one flange over the other.

The winding 131 of an electromagnet is positioned within the housing 122, said magnet having a core 132 and an armature in the form of a rod 133 which carries the movable contact 108 at one end. The rod, at the opposite end, has a reduced portion 134 which extends through an armature 135, and through metal discs, one of which numbered 136 is received between the armature and the diaphragm 130 while the other two discs 137 and 138 are on the opposite side of the diaphragm. The whole assembly of rod, armature and discs is held together by riveting the end of the rod or in any other suitable manner.

Extending through a hole in the shell 129 is a nipple 139 having a flange 140 thereon between which and a washer 141 screwed on the outside of the nipple the shell is clamped to form an air tight joint. A reducing coupling 142 is also screwed on the nipple and connected therewith by a suitable coupling 143 in a suction conduit 144, the other end of which communicates with the intake pipe 145 leading to the engine at a point above the throttle 146, to communicate the engine suction to the diaphragm chamber. A spring 147 normally holds the diaphragm in the position shown in the drawings when the engine is not running.

The winding 131 is connected at one end by a wire 150 with the wire 118 between the generator and the cutout relay and at the other end to a wire 151 leading to the binding post 152 which is electrically connected to the fixed contact of the switch B, the binding post 153 which is connected to the movable contact of said switch B being connected by the wire 154 to the wire 117, leading from the movable contact of the ignition switch to the ignition system, a foot operated button 155 enables the switch B and the accelerator rod 156 to be operated by the driver of the vehicle.

The operation of the secondary switch E is substantially as follows. When the engine is not operating the parts stand in the position shown in Fig. 3, but when the switches A and B are closed the electromagnet of switch E is energized to effect closing of said switch completing the circuit of the starting motor. Obviously when switches A and B are both closed current will flow from the battery to ground through connection 113, and from the battery through wires 111 and 114, switch A, wires 117 and 154, switch B, wire 151, winding 131, wires 150 and 118 to the generator and through wire 120 to ground again, which energizes the magnet with the aforesaid result. The suction of the engine is not sufficient to overcome the pull of the magnet and open switch E, but when the engine begins to run under its own power a counter-electro-motive force is set up by the generator in the winding 131, reducing the pull of the magnet and permitting the suction to effect opening of the switch. Attention is called to the fact that the disc 137 contacts with the metal shell 129 when the suction is effective to open the switch, thus creating a magnetic seal between the said disc and shell, which aids the suction in holding the switch open, enabling a very low suction to perform this function. So low a suction will hold the switch E open after it has once been opened that there is no danger of the switch closing at full open throttle, heavy load when the engine is running slowly and the suction is very low. This relay switch is very little different from that disclosed in application Serial No. 589,642, filed January 29, 1932, and a switch of exactly that form could be employed wherein if so desired.

Figure 4:
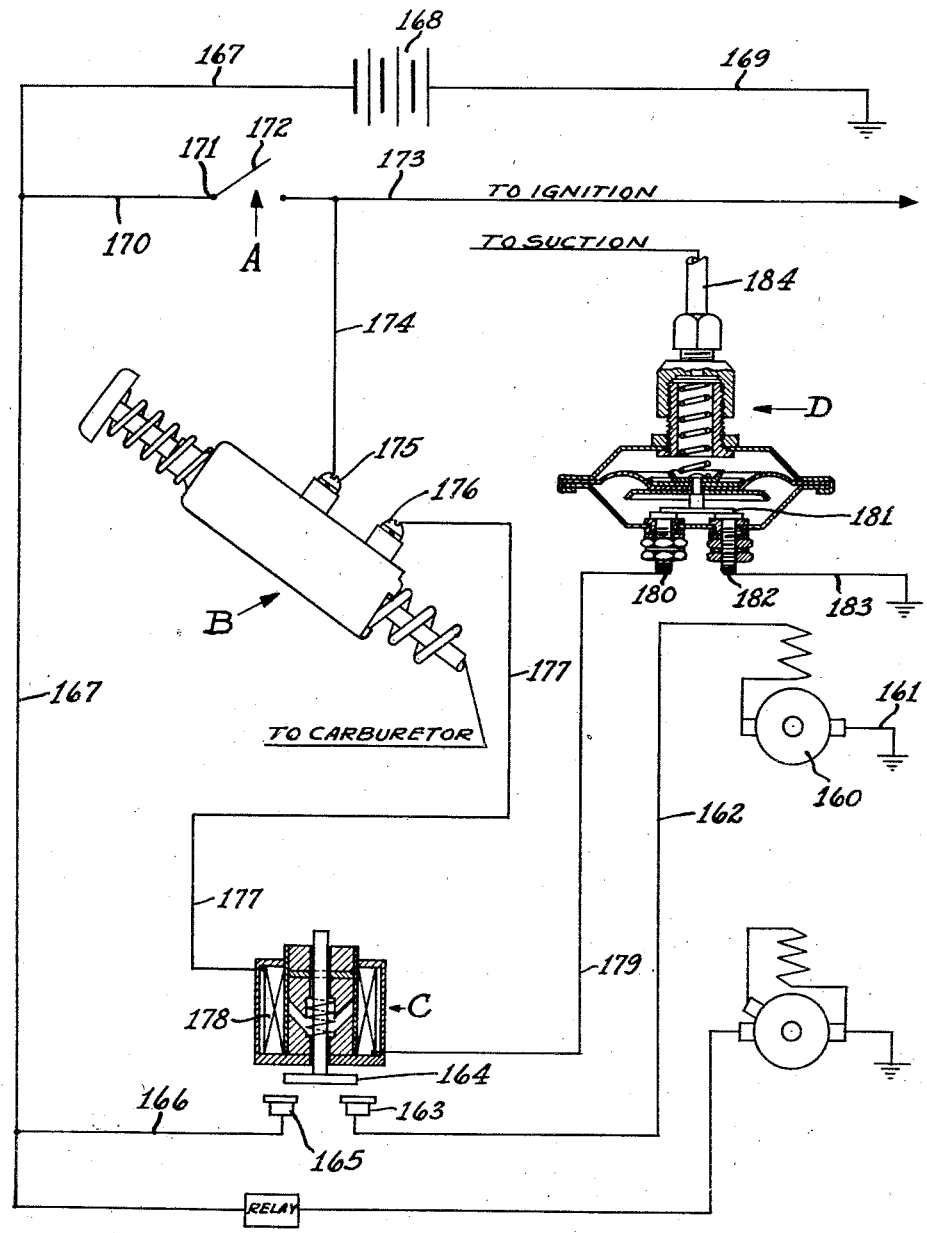
Fig. 4 is a wiring diagram of a modified form of means for controlling the operation of the starting motor by engine suction.

In the form of the invention shown in Fig. 4, the starting motor circuit controlled by a magnetic switch C of exactly the same construction as the switch C, shown in Fig. 1, which is rendered effective to complete the starting motor circuit on operation of manually operable switches A and B. In this modification these switches are also of exactly the same construction as disclosed in Fig. 1, the switch C is rendered ineffective by a suction operated switch D of exactly the same construction as the switch D shown in Fig. 2. It will be noted, particularly that the suction operated switch in this form of the invention, controls the circuit of a magnetic switch instead of controlling the starting motor circuit directly as in Fig. 2. Since the construction of the switches A, B, C and D, employed in this form of the invention is exactly the same as has been previously described, the specific construction of these switches will not be again described only the circuits which these switches control being described specifically hereinafter.

The starting motor 160 is grounded at 161 and is connected by a wire 162 with one fixed contact 163 of the switch C having a movable contact 164 which is adapted to engage the other fixed contact 165, which is connected by a wire 166 to the wire 167 leading to the storage battery 168 grounded at 169. Obviously when the switch C is closed current will flow from the battery to the ground and through the above circuit to the starting motor and to ground again, rendering the starting motor effective to start the engine. As previously stated the closing of the switch C is controlled by the closing of switches A and B and to this end the wire 167 is connected by a wire 170 with the fixed contact 171 of switch A, the movable contact 172 of which is connected by a wire 173 with the ignition system and said wire is connected by a wire 174 with a binding post 175 electrically connected to the movable contact of switch B. The binding post 176 connected to the fixed contact of switch B has a wire 177 attached thereto which leads to one end of the winding 178 of switch C, the other end of which is connected to a wire 179 leading to one fixed contact 180 of the normally closed suction operated switch D. The latter has a movable contact 181 adapted to engage contact 180 and another fixed contact 182 grounded through the connection 183. When switches A and B are closed current flows from the battery to ground through connection 169 and through wires 167 and 170, switch A, wire 174, switch B, wire 177, winding 178, wire 179, switch D and wire 183, to ground again, thus energizing the magnet of switch C and closing the switch. As above stated this will render operative the starting motor which will remain operative until the circuit of switch C is broken by the opening of switch D which is opened by action of the engine suction communicated through a suction conduit 184, in the manner fully set forth, in the description of the form of the invention shown in Fig. 2. When the switch D is opened by engine suction it will remain open as long as the engine continues to run under its own power.

It will be particularly noted that in all of these devices the starting motor is caused to operate by actuation of manually controlled switches, which remain closed as long as it is desired to operate the engine, and that such starting motor is rendered inoperative by automatic switches which become effective when the engine begins to run under its own power, remaining effective so long as it so runs, but which become immediately effective to restart the engine in case it stops. It will be understood, however, that if the engine should stop when the operator has removed his foot from the accelerator pedal the switch B will be open and the accelerator pedal will have to be again operated, before the engine can be started.

A device of this character is particularly desirable for the reason that it eliminates one manual operation which is necessary in the devices of the prior art where a manually operable pedal or switch button controls the operation of the starting motor only. It is particularly advantageous in a vehicle equipped with free wheeling. During free wheeling operation the engine is very likely to stall without knowledge of the driver, which might lead to serious accident and is always an inconvenience in requiring the engine to be started by manual operation of the starter pedal. With the devices disclosed the operator of the vehicle moves the accelerator pedal to resume normal operation at the end of any free wheeling period and if the engine has stopped during free wheeling operation it is automatically started without additional attention by the operator of the vehicle. Also by controlling the starter from the accelerator pedal, the proper positioning of the throttle and the operation of the starting motor is effected by one single element, a very desirable simplification and improvement.

This invention is also superior to such devices of the prior art as include means for rendering the starting motor effective on operation of the ignition switch, because of the additional factor of safety, and less risk of damage to the parts by actuation of the starting motor when the engine is not completely stopped.

While the form of embodiment of the present invention as herein disclosed, constitutes a preferred form, it is to be understood that other forms might be adapted, all coming within the scope of the claims which follow.

What is claimed is as follows:

1. Starting apparatus for internal combustion engines, having in combination, a current source, a starting motor adapted to be operated by current from said source, means for variably controlling the quantity of mixture supplied to said engine while the starting motor is being operated to start said engine, means operated by said mixture controlling means for causing operation of the starting motor, a generator, and means operated by the generator for preventing operation of the starting motor while the engine is operating under its own power.

2. Starting apparatus for internal combustion engines, having in combination, a current source, a starting motor adapted to be operated by current from said source, means for variably controlling the quantity of mixture supplied to said engine while the starting motor is being operated to start said engine, means operated by said mixture controlling means for causing operation of the starting motor, a generator, and means operated by the generator and engine suction for preventing operation of the starting motor while the engine is operating under its own power.

3. Starting apparatus for internal combustion engines, having in combination, a current source, a starting motor adapted to be operated by current from said source, means for variably controlling the quantity of mixture supplied to said engine while the starting motor is being operated to start said engine, means operated by said mixture controlling means for causing operation of the starting motor, a generator, and a single switch controlled jointly by the generator and engine suction and prevented thereby from closing during engine operation so as to prevent operation of the starting motor while the engine is operating under its own power.

4. Starting apparatus for internal combustion engines, having in combination, a current source, a starting motor adapted to be operated by current from said source, a circuit between the starting motor and said current source, means for variably controlling the quantity of combustible mixture while the starting motor is being operated to start the engine, a plurality of switches for controlling the circuit between the starting motor and current source and means whereby one of said switches is controlled by the mixture controlling means and the other of said switches is controlled by engine suction.

5. Starting apparatus for internal combustion engines, having in combination, a current source, a starting motor adapted to be operated by current from said source, a circuit between the starting motor and said current source, means for variably controlling the quantity of combustible mixture while the starting motor is being operated to start the engine, a switch for controlling the circuit between the starting motor and said current source and operable by the mixture controlling means for causing operation of the starting motor and a second switch for controlling the circuit between the starting motor and said current source and operable by engine suction when the engine starts to run to cause the starting motor to become inoperative.

6. Starting apparatus for internal combustion engines, having in combination, a starting motor, a current source adapted to supply current to said starting motor, means for variably controlling the quantity of mixture supplied to the engine while the starting motor is being operated to start said engine, a plurality of switches for controlling the connection of said starting motor with the current source, means operable by said mixture controlling means for causing the closing of both said switches in order to cause operation of the starting motor and means whereby the generator causes the opening of one of said switches when the engine becomes self-operative in order to cause said starting motor to become inoperative.

7. Starting apparatus for internal combustion engines, having in combination, a starting motor, a current source adapted to supply current to said starting motor, means for variably controlling the quantity of mixture supplied to the engine while the starting motor is being operated to start said engine, a plurality of switches for controlling the connection of said starting motor with the current source, including a main starter switch in circuit with the starting motor and a control switch for regulating the action of the main switch, means operable by the mixture controlling means for causing the closing of both of said switches in order to cause operation of the starting motor and means operable by the generator to effect opening of one of said switches when the engine becomes self operative in order to cause the starting motor to become inoperative, irrespective of the other switch.

8. Starting apparatus for internal combustion engines having in combination, a starting motor and in circuit therewith, means for variably controlling the quantity of combustible mixture supplied to the engine while the starting motor is being operated to start the engine, a magnetic switch in the circuit between the current source and starting motor adapted when closed to cause operation of the starting motor, a second switch operable by the mixture controlling means and held closed thereby, as said mixture controlling means is moved to different positions to vary the mixture supply, so as to cause the closing of said magnetic switch, a generator and means whereby the generator causes the opening of said magnetic switch when the engine becomes self operative so as to cause the starting motor to become inoperative.

9. Starting apparatus for internal combustion engines, having in combination, a starting motor and in circuit therewith, means for variably controlling the quantity of combustible mixture supplied to the engine while the starting motor is being operated to start the engine, a magnetic switch in the circuit between the current source and starting motor adapted when closed to cause operation of the starting motor, a second switch operable by the mixture controlling means and held closed thereby, as said mixture controlling means is moved to different positions to vary the mixture supply, so as to cause the closing of said magnetic switch, a generator, and means whereby the generator causes the opening of said magnetic switch entirely irrespective of the condition of said second switch so as to cause the starting motor to become inoperative even if the second switch remains closed.

10. Starting apparatus for internal combustion engines, having in combination, a starting motor and in circuit therewith, means for variably controlling the quantity of combustible mixture supplied to the engine while the starting motor is being operated to start the engine, a main switch in the circuit between the current source and starting motor adapted when closed to cause operation of the starting motor, an electromagnet for operating said switch and provided with a winding, a second switch in circuit with the winding of said magnet, said switch being operable by the mixture controlling means and held closed thereby as said mixture controlling means is moved to different positions to vary the mixture supply, so as to energize the magnet and close the main switch, a generator, and means whereby the generator builds up a counter voltage in the winding of the magnet when the engine becomes self-operative so as to cause said main switch to open and the starting motor to become inoperative.

11. Starting apparatus for internal combustion engines, having in combination, a starting motor and in circuit therewith, means for variably controlling the quantity of combustible mixture supplied to the engine while the starting motor is being operated to start the engine, a main switch in the circuit between the current source and starting motor adapted when closed to cause operation of the starting motor, a plurality of control switches in circuit with the winding of said magnet, one of which is operable by the mixture controlling means and held closed thereby as said mixture controlling means is moved to different positions to vary the mixture supply, and all of which must be closed to energize the magnet and close the main switch, a generator and means whereby the generator causes said magnet to be de-energized when the engine becomes self-operative, so as to cause the main switch to be opened and the starting motor to be rendered inoperative.

12. Starting apparatus for internal combustion engines, having in combination, a starting motor and in circuit therewith, means for variably controlling the quantity of combustible mixture supplied to the engine while the starting motor is being operated to start the engine, a main switch in the circuit between the current source and starting motor adapted when closed to cause operation of the starting motor, a plurality of control switches in circuit with the winding of said magnet, one of which is operable by the mixture controlling means and held closed thereby as said mixture controlling means is moved to different positions to vary the mixture supply, and all of which must be closed to energize the magnet and close the main switch, a generator and means whereby the generator causes said magnet to be de-energized when the engine becomes self-operative, irrespective of the condition of the control switches so as to cause the main switch to be opened and the starting motor to be rendered inoperative even if the control switches remain closed.

13. Starting apparatus for internal combustion engines, having in combination, a starting motor, a current source adapted to supply current to said starting motor, means for variably controlling the quantity of mixture supplied to the engine while the starting motor is being operated to start said engine, a plurality of switches for controlling the connection of said starting motor with the current source, including an ignition switch, a second switch operable by the mixture controlling means and held closed thereby as said mixture controlling means is moved to different positions to vary the mixture supply and a third switch, said switches being so arranged with respect to the starting motor and current source that all of such switches must be closed in order to cause operation of the starting motor, and means operable in response to self-operation of the engine for causing one of said switches to be opened when the engine starts to run so as to cause the starting motor to become inoperative.

14. Starting apparatus for internal combustion engines, having in combination, a starting motor, a current source adapted to supply current to said starting motor, means for variably controlling the quantity of mixture supplied to the engine while the starting motor is being operated to start said engine, a main switch for connecting the starting motor with said current source and a plurality of control switches for controlling the operation of said main switch including an ignition switch and a second switch operable by the mixture controlling mechanism and held closed thereby as said mixture controlling means is moved to different positions to vary the mixture supply, said control switches being so arranged that all of such switches must be closed to cause the closing of the main switch, a generator, and means whereby the generator causes the main switch to be opened when the engine becomes self-operative irrespective of the condition of the control switches so as to cause the starting motor to become inoperative.

15. Starting apparatus for internal combustion engines, having in combination, a starting motor, a current source adapted to supply current to said starting motor, means for variably controlling the quantity of mixture supplied to the engine while the starting motor is being operated to start said engine, a main switch for connecting the starting motor with said current source and a plurality of control switches for controlling the operation of said main switch including an ignition switch and a second switch operable by the mixture controlling mechanism and held closed thereby as said mixture controlling means is moved to different positions to vary the mixture supply, said control switches being so arranged that all of such switches must be closed to cause the closing of the main switch, a generator, and means whereby the generator and engine suction directly control the action of the main switch so as to cause said main switch to be opened and the starting motor to be rendered inoperative when the engine runs under its own power.

16. Starting apparatus for internal combustion engines, having in combination, a starting motor, a current source adapted to supply current to said starting motor, means for variably controlling the quantity of mixture supplied to the engine while the starting motor is being operated to start said engine, a main switch for connecting the starting motor with said current source, a control switch operable by the mixture controlling means and held closed thereby as said mixture controlling means is moved to different positions to vary the mixture supply, so as to cause the closing of the main switch and operation of the starting motor, a generator, and means whereby the generator and engine suction directly control the main switch to cause said switch to be opened and the starting motor to be rendered inoperative when the engine is self-operative, independently of the action of the control switch.

17. Starting apparatus for internal combustion engines, having in combination, a starting motor, a current source adapted to supply current to said starting motor, means for variably controlling the quantity of mixture supplied to the engine while the starting motor is being operated to start said engine, a main switch for connecting the starting motor with said current source, a plurality of control switches for the main switch including a switch operable by the mixture controlling means and held closed thereby as said mixture controlling means is moved to different postions to vary the mixture supply, said switches being normally effective when closed to cause said main switch to close, a generator, and means operated directly by the generator and engine suction to cause said main switch to be held open when the engine is self-operative irrespective of the action of the control switches.

18. Starting apparatus for internal combustion engines, having in combination, a starting motor and in circuit therewith, means for variably controlling the quantity of combustible mixture supplied to the engine, while the starting motor is being operated to start the engine, a main switch in the circuit between the current source and starting motor adapted when closed to cause operation of the starting motor, an electromagnet for operating said switch and provided with a winding, a second switch in circuit with the winding of said magnet, said switch being operable by the mixture controlling means and held closed thereby as said mixture controlling means is moved to different positions to vary the mixture supply, so as to energize the magnet and close the main switch, a generator, means whereby the generator causes the magnet to be de-energized when the engine is self-operative so as to permit opening of the main switch and means operable by engine suction for holding said main switch open when the magnet is de-energized and the engine is running.

19. Starting apparatus for internal combustion engines, having in combination, a starting motor and in circuit therewith, means for variably controlling the quantity of combustible mixture supplied to the engine, while the starting motor is being operated to start the engine, a main switch in the circuit between the current source and starting motor adapted when closed to cause operation of the starting motor, an electromagnet for operating said switch and provided with a winding, a second switch in circuit with the winding of said magnet, said switch being operable by the mixture controlling means and held closed thereby as said mixture controlling means is moved to different positions to vary the mixture supply, so as to energize the magnet and close the main switch, a generator, said generator being in circuit with the winding of said magnet, whereby when the engine is self-operative the generator sets up a counter voltage in the winding and de-energizes the magnet, and means operated by engine suction to hold said main switch open when the magnet is de-energized.

20. Starting apparatus for internal combustion engines, having in combination, a starting motor and in circuit therewith, means for variably controlling the quantity of combustible mixture supplied to the engine while the starting motor is being operated to start the engine, a main switch in the circuit between the current source and starting motor adapted when closed to cause operation of the starting motor, a plurality of control switches in circuit with the winding of said magnet, one of which is operable by the mixture controlling means and held closed thereby as said mixture controlling means is moved to different positions to vary the mixture supply, and all of which must be closed to energize the magnet and close the main switch, a generator, and means whereby the generator and engine suction cause said magnet to be de-energized when the engine is self-operative entirely independently of the control switches so that the starter switch is held open during engine operation although said control switches can remain closed.

21. Starting apparatus for internal combustion engines, having in combination, a starting motor, a current source for supplying current to said motor, a circuit between the motor and the current source, a main starter switch in said circuit having fixed and movable contacts, an electromagnet for operating said switch and provided with an armature carrying the movable contact thereof, means for variably controlling the quantity of combustible mixture supplied to the engine while the starting motor is being operated to start the engine, a control switch for said magnet operable by the mixture controlling means and held closed thereby as the mixture controlling means is moved to different positions to vary the mixture supply so as to energize the magnet and close the main switch, a diaphragm connected to the magnet armature, means for communicating the engine suction to said diaphragm so as to move the diaphragm when the magnet is de-energized, a generator and means connecting the generator in circuit with the magnet so that the generator causes the magnet to be de-energized when the engine is running under its own power, to enable the suction to open said main switch.

22. Starting apparatus for internal combustion engines having in combination, a current source, a starting motor operable by current from said source, an accelerator rod for operating the carburetor throttle to control the engine speed, a switch for controlling the operation of said starting motor comprising fixed and movable contacts carried by said accelerator rod, an operating member for said rod movably supported thereon and operable to move said rod to open the throttle and concurrently to move said movable contact into engagement with the fixed contact to cause operation of the starting motor and to hold said contacts in engagement as long as the accelerator rod is moved out of normal position, and means operable in response to engine operation and independently of said switch for causing said starting motor to become inoperative when the engine becomes self operative.

23. Starting apparatus for internal combustion engines having in combination, a current source, a starting motor operable by current from said source, an accelerator rod for operating the carburetor throttle to control the engine speed, a switch for controlling the operation of said starting motor comprising fixed and movable contacts carried by said accelerator rod, an operating member for said rod movably supported thereon and operable to move said rod to open the throttle and concurrently to move said movable contact into engagement with the fixed contact to cause operation of the starting motor and to hold said contacts in engagement as long as the accelerator rod is moved out of normal position, a second switch in series with the first switch and also controlling the action of the starting motor, and means for opening said second switch when the engine becomes self operative, whereby the starting motor is caused to become inoperative irrespective of the condition of the first named switch.

24. Starting apparatus for internal combustion engines having in combination, a current source, a starting motor operable by current from said source, an accelerator rod for operating the carburetor throttle to control the engine speed, a switch for controlling the operation of said starting motor comprising fixed and movable contacts carried by said accelerator rod and held closed by said rod as it is moved to variably position the throttle, an operating member for said rod movably supported thereon and operable to move said rod to open the throttle and concurrently to move said movable contact into engagement with the fixed contact to cause operation of the starting motor, and means operable independently of said switch for causing said starting motor to become inoperative when the engine becomes self operative.

JOHN B. DYER.